June 2, 1970     D. R. BRATTON     3,515,895

SYNCHRONIZATION CIRCUIT

Filed March 13, 1969     2 Sheets-Sheet 1

INVENTOR.
DAVID R. BRATTON

BY

ATTORNEY

INVENTOR.
DAVID R. BRATTON
ATTORNEY

United States Patent Office 3,515,895
Patented June 2, 1970

3,515,895
SYNCHRONIZATION CIRCUIT
David R. Bratton, Columbus, Ohio, assignor to Solidstate Controls, Inc., a corporation of Ohio
Filed Mar. 13, 1969, Ser. No. 806,896
Int. Cl. H02j 7/00, 1/04
U.S. Cl. 307—64
7 Claims

ABSTRACT OF THE DISCLOSURE

A closed-loop synchronization circuit for maintaining a constant voltage and phase supply to a critical load, utilizing continuous comparisons of the outputs of an inverter and an alternate source. Specifically, the invention utilizes a null detection circuit which assures the driving of the inverter's filter near the peak of its resonance curve. Reference is made to the claims for a legal definition of the invention.

BACKGROUND

In a standby power system which is designed to maintain power to a critical load it is necessary in many situations to have a source of power which does not vary in frequency or phase when switching from a primary source to a secondary source. Any deviation from these stringent requirements could cause a catastrophic failure of several types of electrical loads in existence today. As an example, there are electronic computers which will generate output errors if the computer's input fails for as much as one cycle, or if a large phase shift occurs.

The primary source of power is often an inverter. One of the basic components of a typical inverter system is a constant voltage transformer (CVT). These transformers are used to regulate the voltage output from the inverter and to filter this output to provide a sinusoidal waveform source. It is a characteristic of a CVT to have a variable phase shift between its output and input terminals. The amount of this phase shift is dependent upon the load which is applied to the CVT's output terminals. With full load on the CVT there could be as much as 90° phase shift.

In the prior art much time and money has been expended in an effort to compensate for this variable phase shift. For the most part these efforts have been totally unacceptable. If the frequency, phase, and voltage of the two sources are not equal there will be high circulating currents produced in the system when the switching from one source to the other takes place. These circulating currents can have a destructive effect on the critical load and the power sources.

Previously, the secondary source was fed directly to the inverter for use in regulating the inverter and it was necessary to have a break-before-make switching system. This was a distinct disadvantage because the break-before-make mode, by definition, did not furnish a continuous source of power to the load.

Provision must also be made for the situation where the secondary voltage fails altogether or exceeds a reasonable frequency tolerance. Under these circumstances the synchronization circuit must not make the inverter circuit "follow" the secondary source.

SUMMARY

The present invention relates to a means of providing a critical load with a constant frequency, phase, and voltage source of power. The system comprises a synchronization circuit which, by the use of a closed-loop design, continuously monitors and compares the phase and frequency of a primary and a secondary source. The synchronization circuit includes a null detection circuit and means to utilize the output of the null detection circuit to control the freqency of operation of the oscillator circuit in the inverter.

A constant voltage transformer (CVT) is used to filter the sqaure wave output of the inverter to obtain the sine wave output from the primary source. Unlike the synchronization circuits of the prior art, the output of the CVT and the output of the secondary source are compared for phase and frequency coincidence and a correction signal is sent to the inverter from the synchronization circuit to obtain and maintain the desired synchronization.

Since the CVT is a resonant circuit it must be driven at a frequency near the peak of its resonance curve to maintain the output at the predetermined design voltage. Provision is, therefore, made in the present invention to prevent the synchronization circuit from requiring the primary source to follow the secondary source when the secondary source's frequency goes beyond a predetermined limit.

The present invention, when used in conjunction with a switching circuit which monitors the square wave input to the CVT, will provide a make-before-break system of continuous power.

OBJECTS

It is therefore a principal object of the invention to provide an improved synchronization circuit.

Another object of the invention is to provide a synchronization circuit which permits continuous comparisons of the outputs of a primary and a secondary source.

Another object of the invention is to provide a synchronization circuit which permits synchronization of two sources only when the reference source is within a predetermined "capture" range.

Another object of the invention is to provide a synchronization circuit which may be utilized in a make-before-break switching system.

A further object of the invention is to provide a synchronization circuit which is simple and inexpensive to construct.

Still a further object of the invention is to provide a synchronization circuit which minimizes the inherent phase shift difficulties of the CVT.

For a complete understanding of the invention, together with other objects and advantages thereof, reference may be made to the accompanying drawings, in which:

DESCRIPTION OF THE PREFERRED EMBODIMENT

Figure 1:
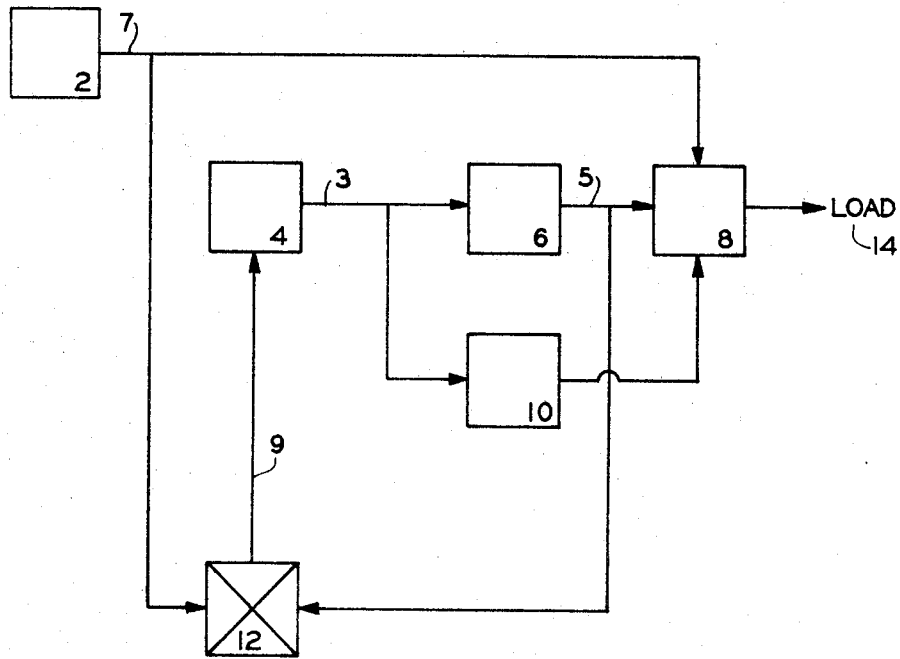
FIG. 1 is a block diagram representation of a typical standby supply system which includes the preferred embodiment of the invention as block 12.

Referring to FIG. 1 there is illustrated in block form a typical system in which the preferred embodiment of the invention may be used. Block 2 represents the secondary source of supply to the critical load 14. An inverter 4 furnishes the primary source of power to the load 14. The output 3 from the inverter goes to the constant voltage transformer (CVT) 6. The output 3 is a square waveform which the CVT 6 regulates and filters to provide a sinusoidal waveform 5 which is fed to the static switch 8 of the system. The output 7 of the secondary source 2 is also fed to the static switch 8.

Block 12 represents the synchronization circuit of the preferred embodiment of the invention. The output 7 of the secondary source 2 is connected to the preferred embodiment 12 as is the output 5 of the CVT 6. The preferred embodiment 12 of the invention monitors these two inputs for frequency and phase coincidence and with this information sends a correction signal 9 to the inverter 4 to bring the two sources 2 and 4 within predetermined frequency and phase limitations.

To complete the description of the typical system, the logic circuitry 10 of the static switch 8 monitors the square waveform input 3 to the CVT 6. With this information the logic circuit 10 controls the static switch 8 and thereby permits switching of the two sources 2 and 4 upon the failure of the inverter 4.

The synchronization circuit 12 is a closed-loop circuit, which continuously monitors the two inputs 5 and 7 for frequency and phase coincidence.

Figure 2:
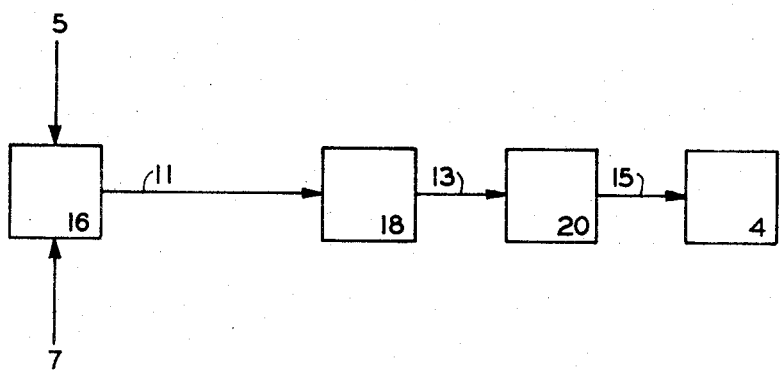
FIG. 2 is a block diagram representation of the preferred embodiment of the invention; and, FIG. 3 is a schematic representation of the preferred embodiment of the invention.

To describe the details of the synchronization circuit 12 of FIG. 1, this circuit is broken down into its constituent circuits shown as blocks in FIG. 2. Block 16 is representative of the null detection circuit which compares the inputs 5 and 7 from the two sources 2 and 4 for frequency and phase coincidence. The output 11 from the null detection circuit 16 passes to the switching circuit 18. Depending on the direction in frequency and phase in which the primary source 4 is moving relative to the reference secondary source 2 the switching circuit 18 will send a positive or negative signal 13 to the frequency connection circuit 20. The frequency correction circuit 20 will control the inverter frequency so that phase and frequency synchronization can be maintained.

Regardless of the magnitude of the frequency or phase error, the recovery rate of the system is essentially constant. When synchronization is attempted within the capture range (the predetermined maximum allowable deviation) of the synchronization circuit 18, the convergence of the output 5 to the output 7 is very smooth, without over-shoot, and takes approximately three seconds. There is also a smooth break-away when a synchronization to the reference secondary source 2 is attempted beyond the capture range.

Figure 3:
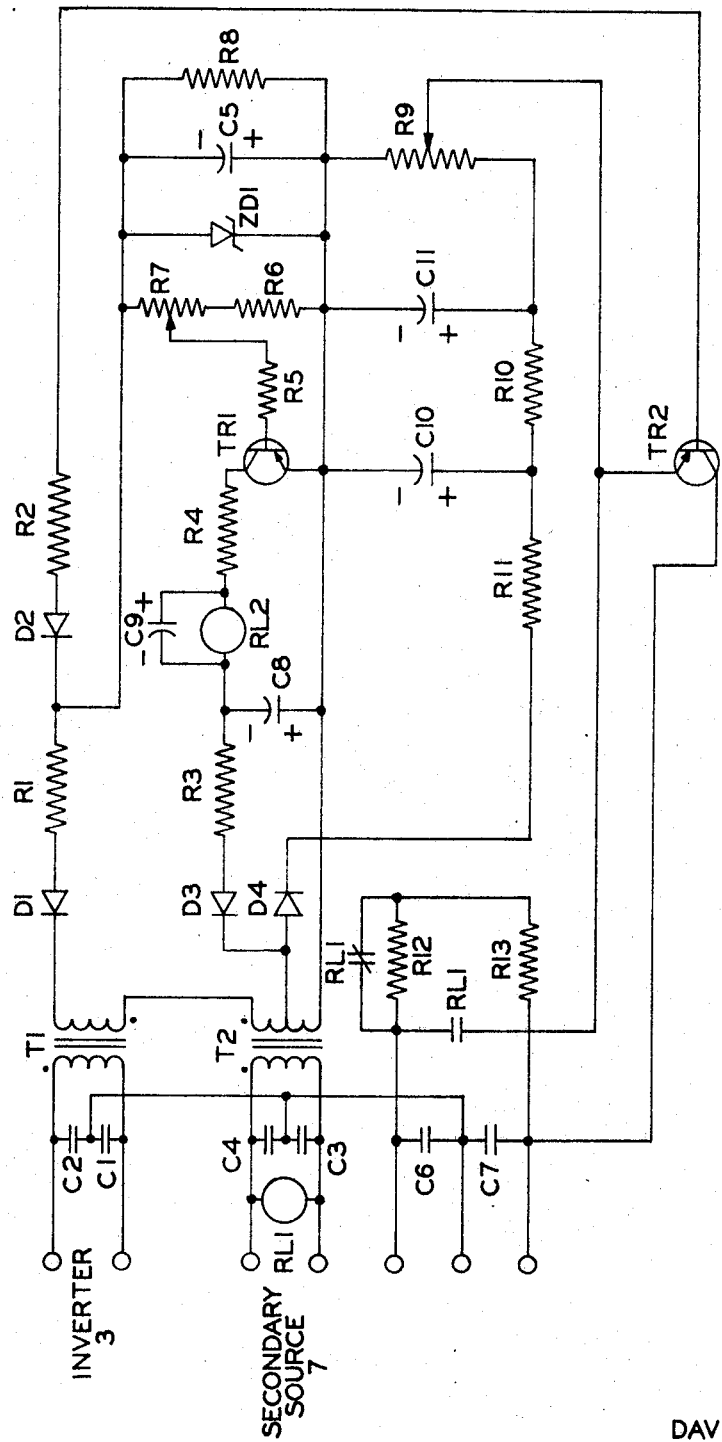

Referring now to FIG. 3 there is illustrated in schematic form the circuit of the preferred embodiment of the invention. The inverter output 3 is connected to the primary of transformer T1 and the output of the secondary source 7 is connected to the primary of transformer T2. The secondaries of transformers T1 and T2 are connected in phase opposition as shown in FIG. 3 by the dots on the transformers' windings. With this configuration an in-phase, in-frequency condition between the two sources 2 and 4, will be seen as a minimum at the end-to-end secondaries of T1 and T2.

The following is a description of the operation of the circuit utilized to maintain zero volt after the transformers T1 and T2. As the phase or frequency error accumulates there will be a current flowing in the secondary of transformers T1 and T2. This current is half-rectified by diode D1, and then passes through resistors R1, R6, and R7. This creates a voltage across resistor R8, capacitor C5, and Zener diode ZD1. The magnitude of this voltage determines the conduction state of transistor TR2. The maximum magnitude is clipped by ZD1 and the time constant of response is determined by the inter-relationship of resistors R1, R2, and R8, and capacitor C5.

The transistor TR2 has a junction voltage drop of approximately 0.6 volt. In order to have zero volt on the transistor at a phase and frequency null it is necessary to compensate for this voltage drop. This purpose is accomplished by several components. Diode D4, resistors R9, R10, and R11, and capacitors C10 and C11, constitute the offset bias supply for transistor TR2's emitter.

After the secondary source 4 is initially activated, relay RL1 is opened. This places resistor R12 into the inverter circuit. The oscillator in the inverter is a free running astable multivibrator which is designed in a conventional manner to run the inverter at a predetermined frequency. Resistor R12 is chosen to be such a value that when it is placed in the multivibrator circuit it will lower the frequency of operation of the inverter by approximately one half of the capture range of the synchronization circuit.

This drop in frequency produces an output from the null detector circuit which includes transformers T1 and T2. This output is a sine wave which has an amplitude that is proportional to the sum of the amplitudes of the primary and secondary sources 2 and 4. The frequency of the output is equal to the difference frequency of the primary and secondary frequencies. Since the inverter (primary) frequency has been lowered by R12 by an amount equal to one half of the capture range, this will be the beat frequency of the transformers' output.

The output from the null detection circuit will turn transistor TR2 on (i.e., it will be biased on). Transistor TR2 is also in the oscillator circuit and its purpose is to raise the frequency of the inverter 4 back up equal to the frequency of the secondary source 2. TR2 does this by having its collector to emitter circuit by-pass resistors R12 and R13. This in effect shunts the resistance which lowered the inverter's frequency in the first instance.

After transistor TR2 has brought the inverter frequency up to the frequency of the secondary source, the transistor begins to run "linear" in order to maintain a zero voltage condition out of the null detection circuit. As there are changes in the phase or frequency of the two sources 2 and 4, the transistor TR2 is driven more "on" or more "off" to compensate for the change.

The synchronization circuit of the invention monitors both the phase and the frequency in the null detection circuitry. The capture range of the synchronization circuit is determined by the biasing of transistor TR2. If TR2 is nonconducting the inverter operating frequency would be below the secondary source frequency by approximately one half of the capture range. With TR2 fully conducting, the inverter frequency is approximately one half of the capture range above the secondary source frequency. Capacitors C1, C2, C3, C4, C6, and C7 are included for noise suppression.

Relay RL2 and the associated components (including diode D3 and transistor TR1) are included in the circuit to monitor when the two sources are in frequency and phase synchronization. These components monitor the instantaneous difference between the inverter output and the secondary source and indicate by means of relay RL2 when a sufficiently close phase-lock is experienced. Suitable time delays are incorporated in this circuit so that hair-trigger sensitivity to instantaneous phase-shifts during small transient loads is eliminated. If there is a null, RL2 is not picked up because TR1 is not conducting. RL2's contacts are utilized to lock out the static switch so that no inappropriate transfer can be made without synchronization. The contacts of RL2 may also be used for signalling means to indicate that there is synchronization between the two sources.

If the synchronization circuit of the present invention were to be utilized in a three-phase system, no modification of the inverter would be required. The synchronization circuit would merely monitor one phase of the secondary source and one phase of the inverter.

Although a certain and specific embodiment has been illustrated, it is to be understood that modifications may be made without departing from the true spirit and scope of the invention.

What is claimed is:

1. A closed-loop synchronization circuit for maintaining a constant frequency, voltage and phase supply to a critical load comprising:
    a reference voltage source,
    a primary voltage source, a null detection means having said reference and said primary source connected thereto, a frequency correction means connected to said null detection means, said null detection means operable to provide an output signal to said frequency correction means, and said frequency correction means connected to said primary source and controlling the frequency of operation of said primary source.

2. A closed-loop synchronization circuit as set forth in claim 1 wherein said primary voltage source comprises a static inverter.

3. A closed-loop synchronization circuit as set forth in claim 1 wherein said null detection means comprises two transformers connected in phase opposition.

4. A closed-loop synchronization circuit as set forth in claim 1 wherein said frequency correction means comprises:

a rectification means, a transistor having said rectification means connected thereto, means to compensate for the junction voltage drop of said transistor, a relay connected to the collector terminal of said transistor, the current through said rectification means controlling the conduction state of said transistor, said conduction state of said transistor controlling the state of said relay, a value of resistance connected between said transistor and said primary source, said conduction state of said transistor controlling the effective value of said resistance.

5. A closed-loop synchronization circuit as set forth in claim 1 wherein said circuit further comprises a null indication means.

6. A closed-loop synchronization circuit as set forth in claim 1 wherein said circuit may be utilized in a three-phase system of supply.

7. A closed-loop synchronization circuit as set forth in claim 1 wherein said signal of said null detection means is a current, said current indicative of the magnitude and direction of the relative difference in frequency and phase between said primary and said secondary sources.

References Cited

UNITED STATES PATENTS

| | | | |
|---|---|---|---|
| 3,201,592 | 8/1965 | Reinert et al. | 307—64 |
| 3,229,111 | 1/1966 | Schumacher et al. | 307—64 |
| 3,300,651 | 1/1967 | Larsen | 307—64 X |
| 3,337,743 | 8/1967 | Rolfes | 307—64 X |
| 3,339,082 | 8/1967 | Rhyne | 307—64 X |

ROBERT K. SCHAEFER, Primary Examiner

H. J. HOHAUSER, Assistant Examiner

U.S. Cl. X.R.

307—60